Jan. 5, 1954  C. H. THAYER  2,665,172
APPARATUS FOR PNEUMATICALLY ELEVATING CONTACT MATERIAL
Filed June 21, 1951

INVENTOR.
CLARENCE H. THAYER
BY
ATTORNEYS

Patented Jan. 5, 1954

2,665,172

UNITED STATES PATENT OFFICE 2,665,172

APPARATUS FOR PNEUMATICALLY ELEVATING CONTACT MATERIAL

Clarence H. Thayer, Wallingford, Pa., assignor to Sun Oil Company, Philadelphia, Pa., a corporation of New Jersey Application June 21, 1951, Serial No. 232,815

6 Claims. (Cl. 302—53)

This invention relates to a system and apparatus for moving pneumatically granular or pelleted contact material or catalyst from a lower receptacle which receives the material in a continuous stream upwardly into and through an elongate conduit to an upper receptacle. In particular the invention is directed to apparatus for supplying gas or air to the material in the lower receptacle in order to convey it therefrom to and through the elongate conduit in such a manner as to reduce attrition of the material particles or pellets to a minimum during its passage to the upper receptacle.

It is well known in the art of catalysis, such as the cracking of heavier petroleum fractions to gasoline and other hydro-carbon processing operations, to use a catalyst or contact material in a continuous system. In such continuous systems a conversion zone is operated simultaneously with a second zone which is in regeneration. Most commercial moving or continuous catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material through a conduit several hundred feet in length in order to return it from the lower reaction zone to the upper reaction zone. From the lower reaction zone the material is delivered by gravity to a receptacle positioned at a level below that of the lower zone, from which receptacle it is necessary to effect or begin the lifting or upward conveying operation. In a pneumatic lifting system this lowermost receptacle is generally known in the art as an engager since the material is engaged therein by the lifting flue gas or air to effect the lifting operation. The lower end of the air lift conduit extends into or is in communication with the engager receptacle while the upper end of the lift conduit communicates with an upper receptacle positioned at a level above the top of the upper reaction zone or chamber. The upper receptacle is designed so that the lifting medium is separated from the catalyst or contact material and is generally known as the disengager.

The present invention involves an arrangement for engaging material to introduce it to the lower inlet end of the elevating conduit and maintaining it in a continuous stream through the conduit for passage to the disengager in a manner to reduce attrition of the material to a minimum.

A complete understanding of the present invention may be had by reference to the following description taken in connection with the accompanying drawings which form a part of the application in which.

Figure 1:
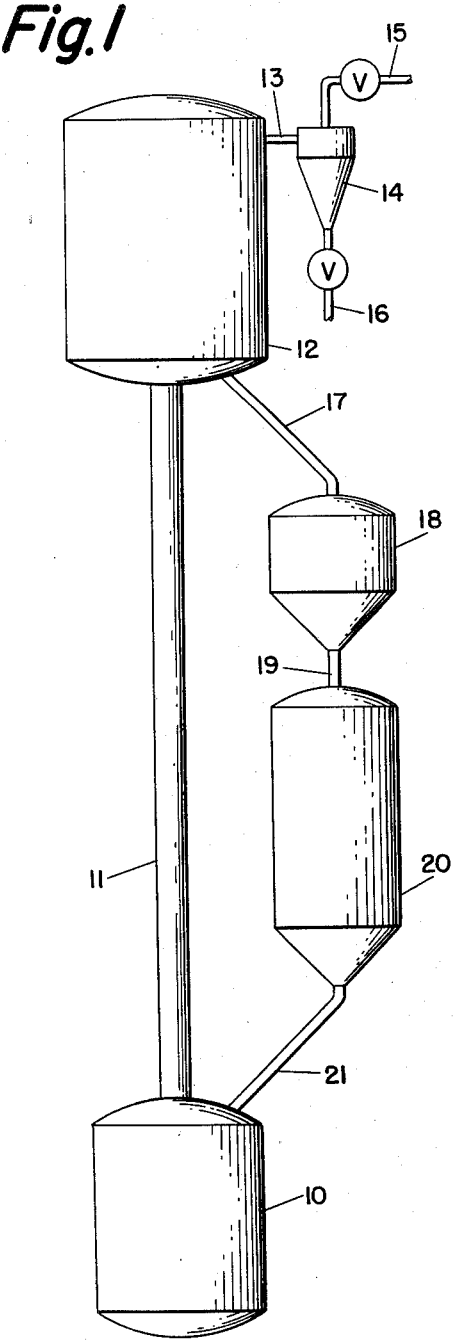
Figure 1 is an elevational view for schematically showing a typical catalytic cracking system employing a pneumatic lift for elevating pelleted catalyst or contact material.

Referring to Figure 1 of the drawing, which shows diagrammatically the conventional elements of a continuous system, a lower receptacle or chamber 10 functions as a catalyst engaging zone, that is, a zone wherein the catalyst is engaged by the air, flue gas or steam supplied thereto by suitable means. The lift pipe or elevating conduit is indicated at 11 and has its lower end communicating with the chamber 10 and its upper end communicating with an upper chamber 12 which is the disengaging chamber or zone wherein the material is disengaged from the air or other elevating medium. The lifting medium is discharged from the upper chamber 12 through a conduit 13 and is passed to any conventional separating means such as a cyclone separator 14 having an upper conduit 15 in communication therewith to remove the lifting medium and a lower conduit 16 for removing any fines which become entrained in the lifting medium.

The catalyst which remains in the disengager 12 is returned through conduit 17 by gravity to an upper reaction chamber 18 wherein usually an onstream reaction is effected to obtain the desired product and continues to flow therefrom through conduit 19 by gravity into a lower reaction chamber 20 wherein the catalyst or contact material is regenerated to remove any deposits which might have been formed on the catalyst in the upper chamber 18. From the lower chamber 20 the catalyst or contact material continues to flow by gravity through conduit 21 and is returned to the engaging chamber 10. The conduits 17, 19, and 21 through which the catalyst or contact material flows in returning from the disengager 12 to the engager 10 are usually provided with means for supplying steam or other gaseous purging medium thereto in order to prevent reaction products formed in chamber 18 and regeneration fumes formed in chamber 20 from communicating with the other chambers in the unit.

Figure 2:
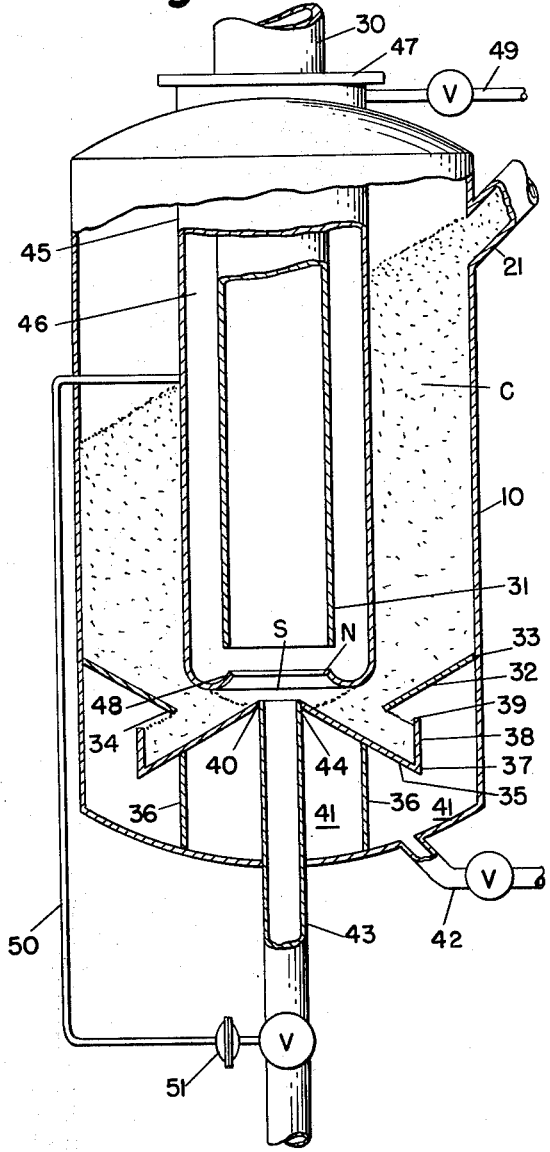
Figure 2 is an enlarged view in sectional elevation showing the invention as applied to the engager portion of the system.

Referring to Figure 2, the engager 10 receives contact material C through conduit 21 and the contact material will acquire an angle of repose as indicated by the dashed lines. The elevating conduit is shown at 30 and has its lower end portion 31 extending into the engager body 10 to be enclosed by the body of contact material C. A plate 32 in the form of an inverted truncated cone has its outer edge 33 secured to the inner wall of the vessel 10 and its inner edge 34 positioned at a level below that of the lower end 31 of the conduit 30. A cooperating plate 35 in the form of a truncated cone is secured in fixed position by means of posts 36 and has its lower edge 37 positioned below the inner edge of the plate 32 and terminates in an upstanding flange 38 which has its upper edge 39 positioned in spaced relation with the plate 32. The plates 32 and 35 will have an angle substantially that of the angle of repose of the contact material C and as the contact material is admitted to chamber 10, it will pass downwardly and over plate 32 and build up on plate 35 and form a space S between the aperture 40 of plate 35 and the lower end of the conduit 30. The flange 38 on plate 35 will prevent the contact material from entering the lower portion of the vessel 10 and provides a chamber 41 to which air is supplied.

In order to elevate the contact material from the engager 10 into and through the conduit 30, a plurality of cooperating lifting fluid supply conduits are provided and to this end a conduit 42 is placed in communication with chamber 41 and the elevating fluid will flow from the chamber 41 through the material on plate 35 and force it into the space S. A cooperating air stream is supplied by pipe 43 which extends upwardly through the bottom of engager 10 and has its upper end 44 secured in the aperture 40 of plate 35 and as the contact material is moved into the space S, the air so supplied will lift the material upwardly from the space S and into the lift conduit 30. A conduit 45 is secured about the elevating conduit 30, providing a space 46 therewith. The conduit 45 has a closed upper end 47 and an open lower upturned end 48 extending below the lower end portion 31 of the lift or elevating conduit 30. The lower end 48 provides in effect a nozzle N through which material is directed from the space S. Lifting medium is supplied to the space 46 by conduit 49 and passes downwardly through space 46 and then upwardly around the nozzle N. The lifting fluid from space 46 tends to force the material toward the longitudinal axis of the conduit 30 and away from its inner wall and hence reduce attrition of the material with the conduit wall.

A conduit 50 is positioned exteriorly of the vessel 10 and has its upper end in communication with the space 46 and its lower end in communication with a diaphragm valve 51 to control the supply of air through conduit 43 in accordance with pressure conditions existing within the space 46.

I claim:

1. Apparatus for elevating granular material from a lower chamber to an upper chamber which comprises an upright elevating conduit having its lower open end extending through the top of said lower chamber to be positioned therewithin and its upper open end extending into the upper chamber, means for supplying contact material to the lower chamber, a plate positioned below the lower end of said conduit providing a lower fluid space with the bottom of the lower chamber, said plate being in the form of a truncated cone and having an upstanding flange at its outer edge positioned in spaced relation with the wall of the lower chamber and adapted to receive a body of contact material, an aperture generally centrally of said plate, a lifting fluid conduit having its upper end extending through the bottom of the lower chamber and received in said aperture in the plate with its lower end portion positioned exteriorly of the lower chamber, means for supplying fluid to said space for directing the body of contact material laterally across the plate toward the upper end of the lifting fluid conduit for passage into and through the elevating conduit.

2. Apparatus for elevating granular material from a lower chamber to an upper chamber which comprises an upright elevating conduit having its lower open end extending through the top of said lower chamber to be positioned therewithin and its upper open end extending into the upper chamber, means for supplying contact material to the lower chamber, a plate positioned below the lower end of said conduit providing a lower fluid space with the bottom of the lower chamber, said plate being in the form of a truncated cone and having an upstanding flange at its outer edge positioned in spaced relation with the wall of the lower chamber and adapted to receive a body of contact material, an aperture generally centrally of said plate, a lifting fluid conduit having its upper end extending through the bottom of the lower chamber and received in said aperture in the plate with its lower end positioned exteriorly of the lower chamber, a baffle ring above said plate having its outer edge secured to the inner wall of the lower chamber and its inner edge disposed inwardly of the outer edge of said plate and adapted to direct contact material to the plate, and means for supplying fluid to said space for directing the body of contact material laterally across the plate toward the upper end of the lifting fluid conduit for passage into and through the elevating conduit.

3. Apparatus for elevating granular material from a lower chamber to an upper chamber which comprises an upright elevating conduit having its lower open end extending through the top of said lower chamber to be positioned therewithin and its upper open end extending into the upper chamber, means for supplying contact material to the lower chamber, a plate positioned below the lower end of said conduit providing a lower fluid space with the bottom of the lower chamber, said plate being in the form of a truncated cone and having an upstanding flange at its outer edge positioned in spaced relation with the wall of the lower chamber and adapted to receive a body of contact material, an aperture generally centrally of said plate, a lifting fluid conduit having its upper end extending through the bottom of the lower chamber and received in said aperture in the plate with its lower end portion positioned exteriorly of the lower chamber, means for supplying fluid to said space for directing the body of contact material laterally across the plate toward the upper end of the lifting fluid conduit for passage into the elevating conduit, a sleeve about and concentric with the elevating conduit providing an upper lifting fluid space for the supply of fluid to assist in the passage of contact material through the elevating conduit.

4. Apparatus for elevating granular material from a lower chamber to an upper chamber which comprises an upright elevating conduit having its lower open end extending through the top of said lower chamber to be positioned therewithin and its upper open end extending into the upper chamber, means for supplying contact material to the lower chamber, a plate positioned below the lower end of said conduit providing a lower fluid space with the bottom of the lower chamber, said plate being in the form of a truncated cone and having an upstanding flange at its outer edge positioned in spaced relation with the wall of the lower chamber and adapted to receive a body of contact material, an aperture generally centrally of said plate, a lifting fluid conduit having its upper end extending through the bottom of the lower chamber and received in said aperture in the plate with its lower end portion positioned exteriorly of the lower chamber, means for supplying fluid to said space for directing the body of contact material laterally across the plate toward the upper end of the lifting fluid conduit for passage into the elevating conduit, a sleeve about and concentric with the elevating conduit providing an upper lifting fluid space for the supply of fluid to assist in elevating the contact material through the elevating conduit, and means between the upper lifting fluid space and the lower end portion of the lifting fluid conduit for controlling the supply of fluid through said lifting fluid conduit.

5. Apparatus for elevating granular material from a lower chamber to an upper chamber which comprises an upright elevating conduit having its lower open end extending through the top of said lower chamber to be positioned therewithin and its upper open end extending into the upper chamber, means for supplying contact material to the lower chamber, a plate in the form of a truncated cone positioned below the lower end of said conduit providing a lower fluid space with the bottom of the lower chamber, said plate having an upstanding flange at its outer edge positioned in spaced relation with the wall of the lower chamber and adapting the plate to receive contact material, an aperture generally centrally of said plate, a lifting fluid conduit having its fluid outlet end extending into the lower chamber to be received in said aperture in the plate with its fluid inlet end portion positioned exteriorly of the lower chamber, means for supplying fluid to said lower fluid space for directing the body of contact material laterally across the plate toward the outlet end of the lifting fluid conduit for passage into and through the elevating conduit.

6. Apparatus for elevating granular material from a lower chamber to an upper chamber which comprises an upright elevating conduit having its lower open end extending through the top of said lower chamber to be positioned therewithin and its upper open end extending into the upper chamber, means for supplying contact material to the lower chamber, a plate positioned below the lower end of said conduit having its outer periphery spaced from the chamber wall and providing a fluid space with the bottom of the chamber, a baffle ring positioned above said plate and having its outer edge secured to the inner wall of the chamber, said plate having an aperture therein aligned generally with the lower end of the elevating conduit, a lifting fluid conduit extending into the lower chamber and having its outlet end received in the aperture in said plate, means for supplying fluid to said fluid space for directing the body of contact material laterally across the plate toward the outlet end of the lifting fluid conduit for passage into and through the elevating conduit.

CLARENCE H. THAYER.

References Cited in the file of this patent

UNITED STATES PATENTS

| Number | Name | Date |
|---|---|---|
| 584,021 | Tilghman | June 8, 1897 |
| 2,433,726 | Angell | Dec. 30, 1947 |
| 2,509,983 | Morrow | May 30, 1950 |
| 2,561,771 | Ardern | July 24, 1951 |